Figure 1:
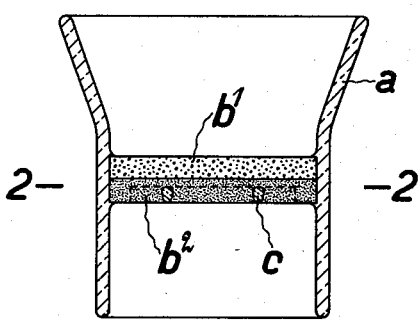
Figure 2:
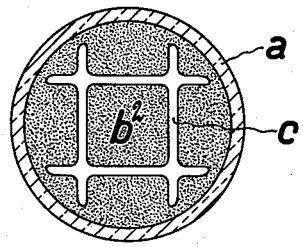

March 15, 1927. 1,620,815

M. HERSCHKOWITSCH ET AL

FILTER

Filed June 12, 1924

Inventors:
Mordko Herschkowitsch
Paul Prausnitz

Patented Mar. 15, 1927.

1,620,815

UNITED STATES PATENT OFFICE.

MORDKO HERSCHKOWITSCH AND PAUL PRAUSNITZ, OF JENA, GERMANY, ASSIGNORS TO THE FIRM SCHOTT & GEN., OF JENA, GERMANY.

FILTER.

Application filed June 12, 1924, Serial No. 719,685, and in Germany June 27, 1923.

The subject of the present invention forms a filter which owing to its high resistance to acid and caustic liquids and on account of its other properties is quite suitable for scientific chemical work as well as for technical purposes. The filter according to the present invention consists of a porous body of fritted glass particles which has been suggested already in itself for filtering purposes and which according to the invention is fused into a vessel of non-porous glass. It has been proved that such a fusion can be attained in both a satisfactory and reliable way, whereby one suitably fuses together such porous and non-porous glass bodies which have the same thermal coefficient of expansion. By the fusion of the filter body proper into the vessel each gap between the filter-body and the vessel and likewise each cement, always forming an objectionable foreign substance at the junction of the porous body and the vessel is avoided. Besides, the smooth glass wall of the vessel prevents a liquid filtered or to be filtered from rising up the wall of the vessel, which is particularly of advantage in the case of quantitative chemical analyses, and the glass vessel, if being transparent, admits of easily observing the progress of work.

The annexed drawing shows in a cross section a constructional example of a filter according to the invention in which the vessel is funnel-shaped. The filter consists of a glass vessel $a$ into which is fused a porous plate, composed of two superposed parts $b^1$ and $b^2$. Both parts $b^1$ and $b^2$ are likewise fused together and, in order to render harmless influences of temperature and to attain a satisfactory fusing to the vessel $a$, the parts $b^1$ and $b^2$ are made of glass powder having the same thermal coefficient of expansion as the glass used for the vessel $a$, the upper part consisting of a coarser powder than the lower one. In addition, with a view to reinforcing the plate $b^1$, $b^2$ a grating $c$ of non-porous glass is fused into the lower part $b^1$.

We claim:

In a filter a porous body of fritted glass particles, and a non-porous glass vessel into which the said porous body is fused.

MORDKO HERSCHKOWITSCH.
PAUL PRAUSNITZ.